Patented Nov. 26, 1929

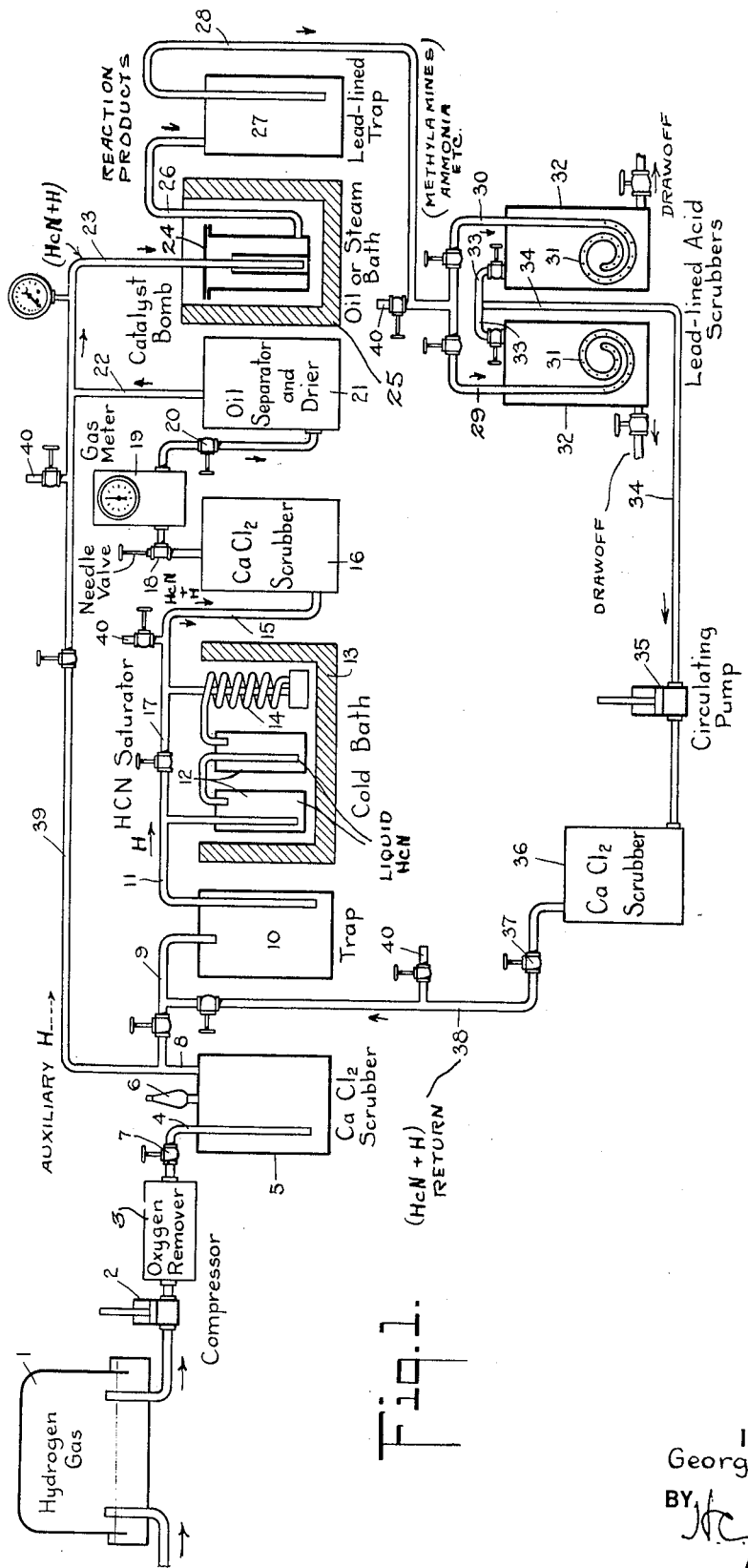

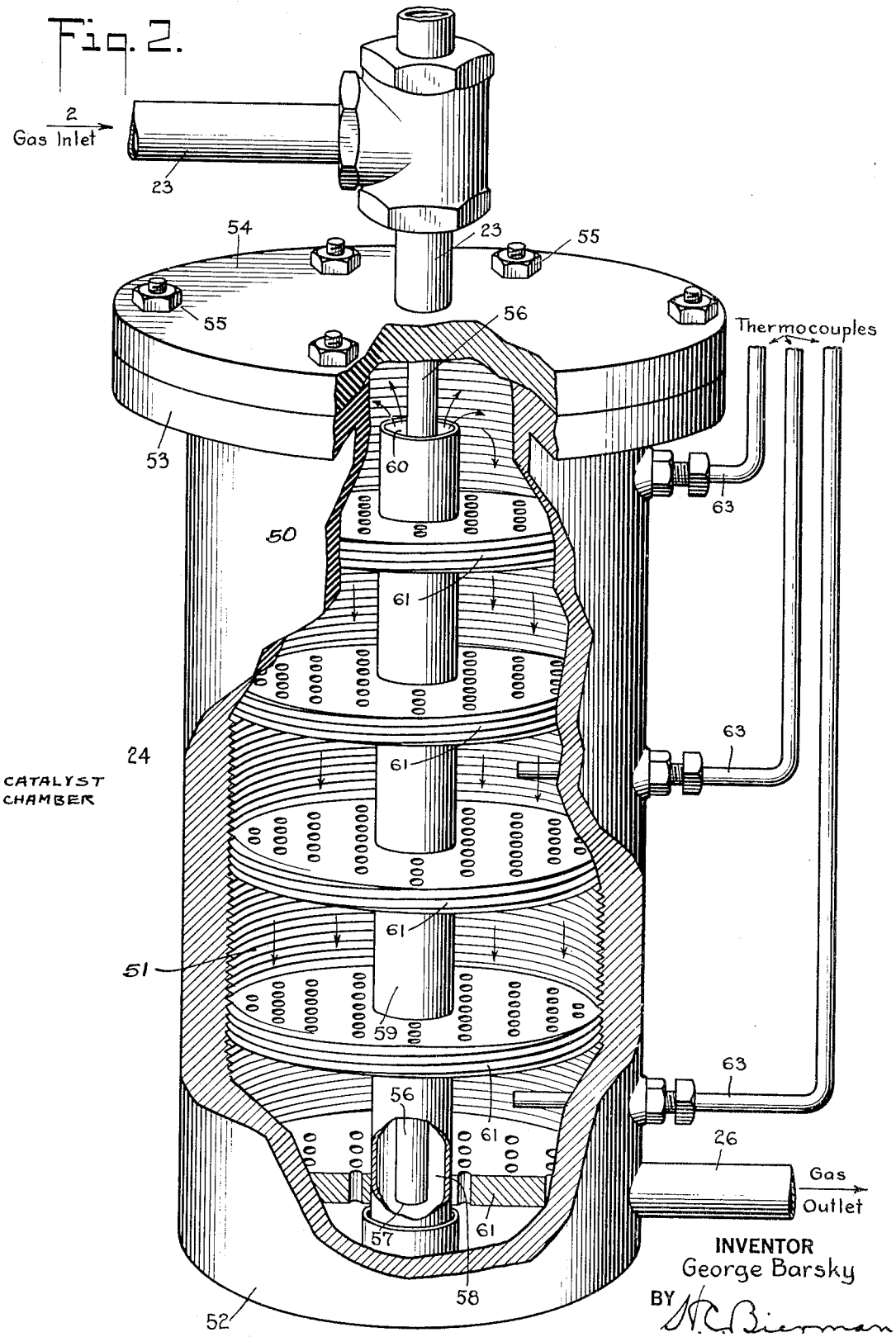

1,736,872

UNITED STATES PATENT OFFICE

GEORGE BARSKY, OF NEW YORK, N. Y., ASSIGNOR TO AMERICAN CYANAMID COMPANY, OF NEW YORK, N. Y., A CORPORATION OF MAINE

METHOD OF MAKING METHYLAMINE

Application filed March 30, 1926. Serial No. 98,409.

This invention relates to the manufacture of methylamine, more particularly to improvements in the method of producing the same by reducing hydrocyanic acid in the presence of a platinum catalyst.

The production of methylamine by various methods has been proposed at different times but the only method which is simple and theoretically should give excellent results is that involving the reduction of hydrocyanic acid by means of hydrogen and a catalyst.

As early as 1863, (Chemical Society Journal, London, volume 16, 1863, page 249) Debus passed a mixture of hydrogen and hydrocyanic acid gas over a platinum black catalyst and noticed that a violent reaction took place with the evolution of considerable heat, giving a product that contained considerable methylamine. However, the activity of the catalyst decreased very rapidly and he stated that this decrease was due to the formation of a double cyanide of methylamine and platinum, which he isolated. It was his opinion that, but for the formation of this compound, the reduction method of preparing methylamine would be the most convenient and technically the simplest. In the intervening years various investigators have worked on the problem but as far as I am aware no one has succeeded in overcoming the inherent, rapid decrease in the activity of the catalyst which renders commercial production of methylamine impossible.

In 1919 Barrett and Titley published an article (Chemical Society Journal, London, volume 115, 1919, pages 902-7) as result of experiments on this method and stated that a 20% platinum black was a very satisfactory catalyst and that an increase in the temperature of the reaction resulted in increased efficiency of reduction while causing no appreciable change in the composition of the reaction products. They stated that a temperature of 250° C. gave good results. However, the best grade of product made by these authors analyzed only 72% methylamine, and contained about 20% ammonia and 8% di-methylamine. None of the results obtained by these or other investigators were sufficiently promising to warrant commercial adoption of the methods developed, and my invention is intended to so improve the same as to render the process operable on a large scale.

In view thereof, it is among the objects of this invention to improve the reduction method for making methylamine so that the catalyst shall have a long life and shall be highly efficient during long periods of operation.

It is also among the objects of this invention to make a product which is high in methylamine and low in other reduction products, and a method in which the conditions of operation are practically automatic, requiring but little supervision.

I have made a long and exhaustive study of the reaction and have conducted many series of experiments, as the result of which I have concluded that the rapid decrease in activity of the catalyst was due primarily to the poisoning thereof by the formation of tarry substances. If these substances are removed from the catalyst, for instance, by oxidation with a nitric acid solution, the catalyst regains its original activity. However, for a commercial operation it is not feasible to run the catalyst for only the short period of time until it becomes so poisoned as not to produce any appreciable quantities of methylamine, and the problem therefore resolves itself into the prevention of the formation of the tarry substances. Apparently these substances are formed by complex reactions involving one or more of the reduction products of the reaction, for instance, a reaction between hydrocyanic acid and methylamine. The other reaction products, such as ammonia, di-methylamine and tri-methylamine probably also react and tend to increase the tar formation.

I have determined that the conditions surrounding the reduction of the mixture of hydrocyanic acid gas and hydrogen may be so controlled as to prevent the formation of tar, and my study has shown that the following conditions are necessary or desirable in preventing or minimizing the formation of tar and the maintenance of the catalyst at a high degree of activity and efficiency over long periods of continuous operation.

1. The uniform temperature of the catalyst. This prevents hot spots and thus avoids undue formation of undesirable reduction products and increases the quality of the resulting methylamine.

2. A low percentage of platinum in the catalyst, which decreases the formation of tar.

3. A low percentage of reduction of the reaction mixture, which reduces the concentration of methylamine in the resulting product and thus reduces the speed of the reaction between hydrocyanic acid and methylamine with its attendant undesirable formation of tar.

4. A low ratio of hydrocyanic acid gas to hydrogen, reducing the concentration of hydrocyanic acid in the resulting product and minimizing the reaction with methylamine to form tar.

5. A low temperature of reaction, which increases the quality of the product by minimizing undesirable reduction reactions and avoids the formation of decomposition products.

6. The freedom of the reaction mixture from oxygen, hydrogen sulphide and water avoids poisoning of the catalyst and also avoids some tar formation.

7. Scrubbing the products of the reaction while still hot with an acid, preferably at a temperature below 35° C., whereby the methylamine is quickly removed from the other gases and the possibility of reaction thereof with hydrocyanic acid is practically eliminated.

In addition to the above factors which are of great importance in a commercial operation, the following factors are also of importance as adding to the efficiency of the process.

1. A high pressure of the gases during the reaction, which increases the amount of reducton in a given period of time and thus decreases the cost of the platinum per unit of resulting product.

2. Starting the reaction with a fresh catalyst at a low temperature and raising the said temperature slightly as the activity of the catalyst decreases.

3. Scrubbing the reaction products under pressure, which more quickly and completely removes the methylamine.

4. A recirculation of the gases through the system, which allows a practically theoretical efficiency in the reduction of the hydrocyanic acid.

5. The re-activation of the catalyst by means of a solution of nitric acid.

6. The construction of the reaction chamber so as to give a uniform temperature and the preheating of the gases to be reduced.

7. The rate of passage of the gases through the catalyst in order to give the maximum speed of reduction consistent with the other factors involved.

In practicing my invention I provide a mixture of hydrocyanic acid gas and hydrogen and pass the same through a catalyst, which is generally of platinum black deposited on asbestos, and I maintain the temperature of the reaction chamber between 100° C. and 200° C. but preferably within narrower limits, say 150° C. and 175° C. The rate of passage of the gaseous mixture through the catalyst is such that about 25% of the hydrocyanic acid in the mixture is reduced and, in terms of catalyst space, the mixture is passed therethrough at the rate of about 0.2 cubic feet per hour per cubic inch, containing from 0.1 to 0.4 grams of platinum per cubic inch. By means of conducting metal plates and by a special construction of the reaction chamber whereby the incoming gases are caused to flow in heat exchanging relation with the catalyst before coming in contact therewith, the temperature of the whole mass of catalyst is maintained substantially uniform. The amount of platinum in the catalyst is in practically all cases less than 20%, generally from about 5% to 10%. The ratio of the hydrocyanic acid gas to the hydrogen is usually less than 16% and preferably about 7% to 8%. To increase the amount of reduction per unit of platinum used, the system is operated at a pressure above atmospheric, usually between 50 pounds and 100 pounds per square inch. The resulting product is scrubbed with an acid, such as sulphuric acid, while still hot and the gases are recirculated through the system, and the scrubbing may take place either at atmospheric pressure or at the pressure of the reaction chamber. As the activity of the catalyst decreases with time, the temperature of the reaction may be raised to a slight extent, thereby assisting in maintaining the activity thereof over longer periods of time.

In the accompanying drawing constituting a part hereof and in which like reference characters indicate like parts;

Fig. 1 is a diagrammatic view of an apparatus adapted to the practice of my invention, and Fig. 2 is an enlarged view of the reaction chamber, some parts being broken away and some parts being shown in section for clearness.

The hydrogen storage tank 1 is connected to a compressor 2 and to a device 3 containing pyrogallic acid or an oxygen removing catalyst, the hydrogen passing therefrom through a pipe 4 into a scrubber 5, containing calcium chloride for the removal of water. A safety pressure valve 6 is mounted on scrubber 5 and a check valve 7 prevents any backward flow of gases. From the scrubber 5 a pipe 8 leads to a valve controlled pipe 9 entering trap 10. From the trap a pipe 11 leads to two cylinders 12 in series containing liquid hydrocyanic acid and immersed in an ice or cold water bath 13. In passing through the cylinders 12 the hydrogen gas becomes saturated with hydrocyanic acid at the temperature of the bath and the mixture then passes through coil 14, pipe 15 and calcium chloride scrubber 16. A by-pass 17, provided with a valve, allows part of the hydrogen to be passed around the saturators. The mixture then flows through hydraulic needle valve 18, meter 19, past check valve 20, through oil separator 21, through pipes 22 and 23 and into the reaction chamber 24 which is immersed in an oil bath 25, whereby the temperature of the chamber 24 may be controlled. The reaction products are taken off through pipe 26, pass through trap 27, pipe 28 and one or the other of valve controlled pipes 29 and 30 terminating in perforated coils 31 in the bottom of acid scrubbers 32. Valve-controlled pipes 33 from the scrubbers lead to a common pipe 34, the gases flowing through circulating pump 35, calcium chloride scrubber 36, past the check valve 37, through valve-controlled pipe 38 and into pipe 9. A by-pass 39 for hydrogen connects pipe 8 with pipes 22 and 23. Valve controlled vent pipes 40 are placed at various points in the system.

The catalyst or reaction chamber 24 consists of a steel shell 50 having a threaded inner surface 51 and a closed end 52. The opposite end is formed with a flange 53 upon which a cover 54 is adapted to seat and is held in place by bolts 55. A pipe 56 constituting an extension of pipe 23 passes through cover 54 and along the axis of the shell 50, terminating at point 57 in the bottom of the reaction chamber. Gases passing through pipe 56 emerge from the end 57 thereof and pass in counter direction in the space 58 between pipe 56 and concentric pipe 59, the upper end 60 of which is open and allows the gases to escape into the reaction chamber proper. A series of perforated baffle plates 61 are threaded into the walls of the shell 50 to provide good heat conduction and the catalyst is placed thereon, the gases passing through the layers of catalyst and the perforations of the plates and out through pipe 26. Thermocouples 63 are provided at various points in the reaction chamber for observation of the temperature of the reaction.

In operating the apparatus for the production of methylamine, hydrogen from tank 1 is caused to flow under the pressure of compressor 2, at a pressure of say 50 pounds to 100 pounds per square inch, through the cylinders 12 of liquid hydrocyanic acid in the cold water bath 13 whereby the proper mixture, containing say 7% to 8% of hydrocyanic acid gas is produced, the said mixture being dried in scrubber 16. The mixture is then passed into the reaction chamber 24, which is maintained at a temperature of 165° C. by means of the oil bath 25, at the rate of about 0.2 cubic feet per hour per cubic inch of catalyst space, whereby about 25% of the hydrocyanic acid is reduced. The amount of platinum black in the catalyst is about 5%, each cubic inch of space containing about 0.1 gram of platinum. The reaction products are then passed through pipe 26 into one or the other of scrubbers 32 containing sulphuric acid, whereby the methylamine, ammonia, dimethylamine and tri-methylamine produced are absorbed and the remaining gases are passed through pipe 34 and back to the system through pipe 38 by means of the circulating pump 35 which builds up the pressure to the proper point, being mixed with additional quantities of hydrogen and hydrocyanic acid and again passed through the reaction chamber.

The by-pass 17 allows a variable, controlled proportion of the hydrogen to be passed around the cylinders 12 and provides a means for accurately varying the proportions of the gases in the reacting mixture, in addition to the control afforded by variation in the temperature of the bath 13.

As the activity of the catalyst decreases with time, the temperature of the reaction chamber is increased and I have found that a suitable increase of temperature is about 1½° C. per 24-hour day. Starting with the operating temperature of 165° C., the temperature of the reaction chamber may be increased up to about 180° C., after which it is advisable to reactivate the catalyst. This is done by removing the same from the reaction chamber and washing with a 30% nitric acid solution. In case a fresh catalyst is used, it is necessary to hydrogenate the same and it is preferable to accomplish this in the reaction chamber. For this reason there is provided the valve-controlled pipe 39 which allows hydrogen alone to be passed through the system for the reduction of the platinum compound, such as chloro-platinic acid to platinum black, as is well known.

It will be noted that I have provided a system which is automatic in its operation in that all it is necessary to do is to provide a source of hydrogen and hydrocyanc acid and periodically remove the reduction product from the system. The apparatus requires but little attention, it being merely necessary to watch controls so as to insure the proper operating conditions at all times. The reduction product is of considerably higher quality than had been previously produced by the catalytic reduction of hydrocyanic acid and I have consistently obtained a product analyzing about 90% methylamine, whereas the best product heretofore made, as far as I am aware, contained only 72% methlyamine. Whereas according to prior methods the catalysts in a very few hours become so contaminated and so poisoned as to cease functioning, with the aid of my invention the life of the catalyst has been so increased that I have operated continuously for several weeks without any substantial decrease in the activity or efficiency of the catalyst.

Although I have described my invention setting forth certain details of construction of the apparatus and certain conditions for the operation of the method, various changes may be made therein without departing from the principles set forth. For instance, I may use instead of asbestos some other material as a base for the platinum, such as magnesia, and I may substitute for platinum black a mixture of platinum oxide and ferrous chloride which has given good results. I may also use a palladium, lead or nickel catalyst or any other hydrogenating catalyst in place of the platinum. Instead of maintaining substantially the entire system under pressure, I may merely provide sufficient pressure to cause the gases to flow through the system, or I may compress the gases just before they enter the reduction chamber and reduce the pressure either before or after the acid scrubbing operation. My method may be varied by the use of different temperatures, pressures, speed of gases through the system, composition of gases and in various other ways, and the apparatus may be altered as will be apparent to those skilled in the art, my invention being limited only by the claims appended thereto.

What I claim is:

1. A method of making methylamine which comprises providing a mixture of hydrogen and hydrocyanic acid gas, passing the same through a hydrogenating catalyst, and maintaining the temperature thereof between 150° C. and 170° C.

2. A method of making methylamine which comprises providing a mixture of hydrogen and hydrocyanic acid gas, passing the same through a hydrogenating catalyst at a pressure substantially above atmospheric, and maintaining the temperature thereof between 100° C. and 200° C.

3. A method of making methylamine which comprises providing a mixture of hydrogen and hydrocyanic acid gas, passing the same through a platinum containing catalyst, and maintaining the temperature thereof between about 150° C. and 170° C.

4. A method of making methylamine which comprises providing a mixture of hydrogen and hydrocyanic acid gas, passing the same through a platinum containing catalyst, and maintaining the temperature thereof between 100° C. and 200° C., the rate of passage through the catalyst of the hydrocyanic acid mixture being such that about 25% of the same is reduced.

5. A method of making methylamine which comprises providing a mixture of hydrogen and hydrocyanic acid gas, passing the same through a platinum containing catalyst, and maintaining the temperature thereof between 100° C. and 200° C., the rate of passage through the catalyst of the gaseous mixture being about 0.2 cubic foot per hour per cubic inch of catalyst.

6. A method of making methylamine which comprises providing a mixture of hydrogen and hydrocyanic acid gas, passing the same through a platinum containing catalyst, and maintaining the temperature thereof between 150° C. and 170° C., the amount of platinum in the catalyst being less than 20%.

7. A method of making methylamine which comprises providing a mixture of hydrogen and hydrocyanic acid gas, passing the same through a platinum containing catalyst, and maintaining the temperature thereof between 150° C. and 170° C., the amount of platinum in the catalyst being less than 10%.

8. A method of making methylamine which comprises providing a mixture of hydrogen and hydrocyanic acid gas, passing the same through a platinum containing catalyst, and maintaining the temperature thereof between 150° C. and 170° C., the amount of platinum in the catalyst being about 5%.

9. A method of making methylamine which comprises providing a mixture of hydrogen and hydrocyanic acid gas, passing the same through a platinum containing catalyst, maintaining the temperature thereof between 150° C. and 170° C., and scrubbing the hot gases with an acid to remove the reduction products.

10. A method of making methylamine which comprises providing a mixture of hydrogen and hydrocyanic acid gas, passing the same through a platinum containing catalyst, maintaining the temperature thereof between 150° C. and 170° C., removing the reduction products and recirculating the gases through the system.

11. A method of making methylamine which comprises providing a mixture of hydrogen and hydrocyanic acid gas, passing the mixture through a platinum containing catalyst, and maintaining the temperature thereof between 100° C. and 200° C., the pressure in the system being superatmospheric.

12. A method of making methylamine which comprises providing a mixture of hydrogen and hydrocyanic acid gas, passing the same through a platinum containing catalyst, and maintaining the temperature thereof between 100° C. and 200° C., the pressure in the system being about 50 pounds to 100 pounds per square inch.

13. A method of making methylamine which comprises providing a mixture of hydrogen and hydrocyanic acid gas, passing the same through a platinum containing catalyst, and maintaining the temperature thereof between 150° C. and 170° C., the ratio of hydrocyanic acid to hydrogen being less than 16%.

14. A method of making methylamine which comprises providing a mixture of hydrogen and hydrocyanic acid gas, passing the same through a platinum containing catalyst, and maintaining the temperature thereof between 150° C. and 170° C., the ratio of hydrocyanic acid to hydrogen being about 7% to 8%.

15. A method of making methylamine which comprises providing a mixture of hydrogen and hydrocyanic acid gas, passing the mixture through a platinum containing catalyst, and maintaining the temperature thereof between 100° C. and 200° C., the pressure in the system being superatmospheric, and remove the reduction products and recirculating the gases through the system.

16. A method of making methylamine which comprises providing a mixture of hydrogen and hydrocyanic acid gas, passing the same through a platinum containing catalyst, maintaining the temperature thereof between 150° C. and 170° C., and slowly increasing the temperature to compensate for the decrease in activity of the catalyst.

17. A method of making methylamine which comprises providing a mixture of hydrogen and hydrocyanic acid gas, passing the same through a platinum containing catalyst, maintaining the temperature thereof between 100° C. and 200° C., the rate of passage through the catalyst of the hydrocyanic acid mixture being such that about 25% of the same is reduced removing the reduction products and recirculating the gases through the system.

In testimony whereof, I have hereunto subscribed my name this 25th day of March, 1926.

GEORGE BARSKY.